(12) United States Patent
Lin et al.

(10) Patent No.: US 7,800,704 B2
(45) Date of Patent: Sep. 21, 2010

(54) LIQUID CRYSTAL DISPLAY COMPRISING INTERSECTING COMMON LINES

(75) Inventors: Sung-Chun Lin, Tainan (TW); Chia-Hua Yu, Banciao (TW); Chia-Te Liao, Kaohsiung (TW); Hsuan-Chen Liu, Kaohsiung (TW); Chen-Yin Su, Kaohsiung (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 897 days.

(21) Appl. No.: 11/559,033

(22) Filed: Nov. 13, 2006

(65) Prior Publication Data

US 2008/0111962 A1 May 15, 2008

(51) Int. Cl.
*G02F 1/1343* (2006.01)
(52) U.S. Cl. .......................... 349/39; 349/38
(58) Field of Classification Search ........................ None
See application file for complete search history.

(56) References Cited

U.S. PATENT DOCUMENTS

| | | | |
|---|---|---|---|
| 2004/0235227 A1* | 11/2004 | Kawase | 438/158 |
| 2004/0263704 A1* | 12/2004 | Oh et al. | 349/43 |
| 2005/0092991 A1* | 5/2005 | Ahn et al. | 257/59 |
| 2006/0092342 A1* | 5/2006 | Lee | 349/38 |
| 2006/0290863 A1* | 12/2006 | HoeSup | 349/141 |

FOREIGN PATENT DOCUMENTS

JP 11-15016 A * 1/1999

* cited by examiner

*Primary Examiner*—Mike Stahl
(74) *Attorney, Agent, or Firm*—WPAT, P.C.; Anthony King (57) ABSTRACT

A liquid crystal display is disclosed. The liquid crystal display comprises a gate line, a data line, a first common line and a continuous second common line. The gate line is disposed on a substrate, and the data line intersects the gate line. The first common line is parallel with the gate line and the second common line intersects through the gate line. By this invention, the first common lines and second common lines of pixels can form a reticular structure for reducing RC delay effect of the common line.

14 Claims, 7 Drawing Sheets

LIQUID CRYSTAL DISPLAY COMPRISING INTERSECTING COMMON LINES

FIELD OF THE INVENTION

The present invention relates to a liquid crystal display, and more particularly to a liquid crystal display comprising common lines forming a reticular structure.

BACKGROUND OF THE INVENTION

In general, a liquid crystal display (LCD) device is capable of adjusting light transmission ratios of liquid crystal cells to display image data by individually supplying data signals corresponding to the image data to the liquid crystal cells. Accordingly, the LCD device includes a liquid crystal display panel in which liquid crystal cells are aligned in a matrix configuration and a driver integrated circuit (IC).

The liquid crystal display panel includes a color filter substrate and a thin film transistor (TFT) array substrate that oppose each other and a liquid crystal layer between the color filter substrate and the TFT array substrate. The TFT array substrate includes data lines for transmitting data signals supplied from a data driver IC to the liquid crystal cells and orthogonal gate lines for transmitting scan signals supplied from a gate driver IC, wherein the liquid crystal cells are defined at intersections of the data lines and gate lines. The gate driver IC sequentially supplies scan signals to the gate lines to sequentially select liquid crystal cells on a one by one basis. In addition, the data driver IC supplies data signals to the liquid crystal cells of selected gate lines.

Figure 1:
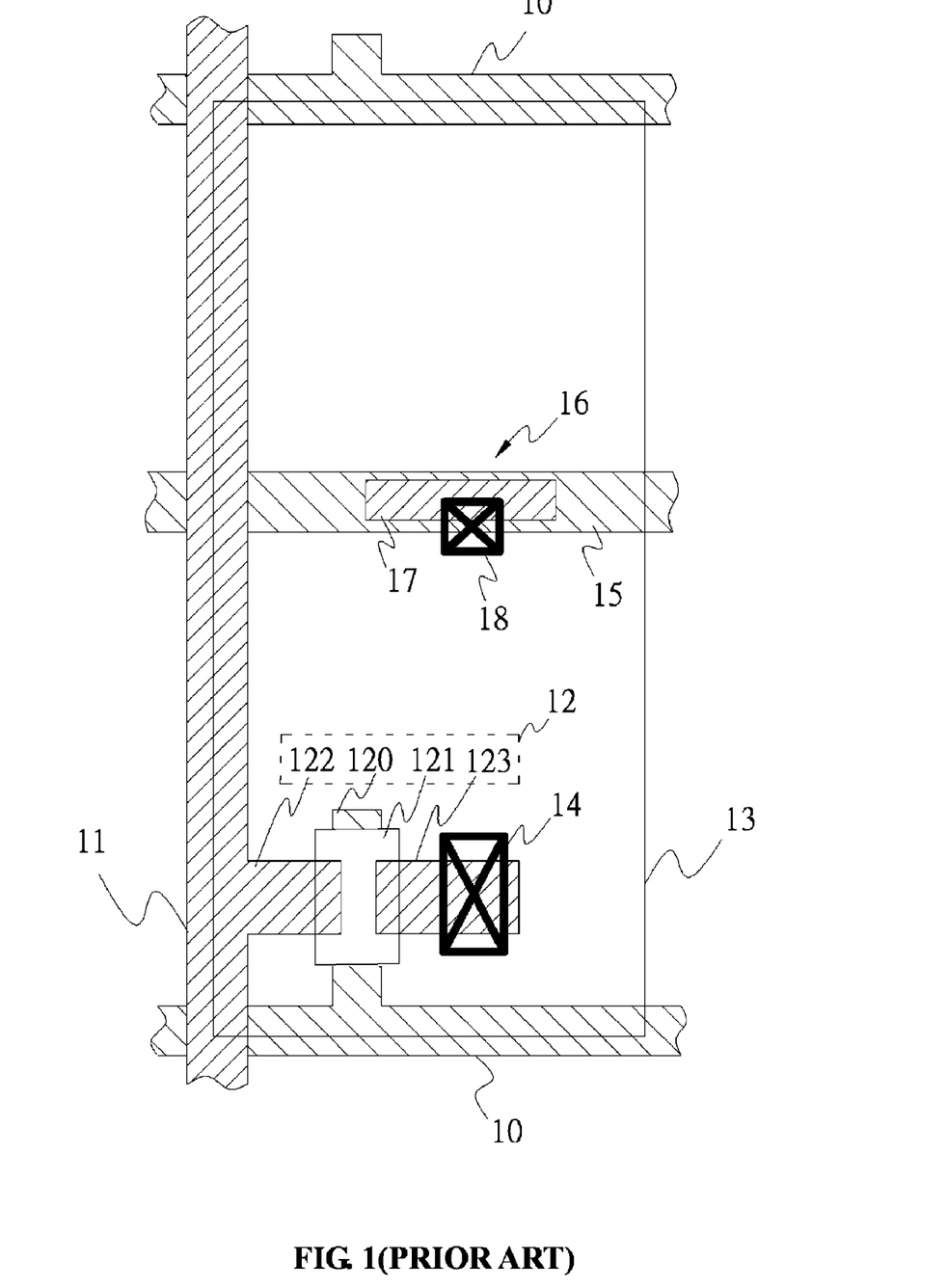
FIG. 1 is a top view of a conventional pixel structure.

FIG. 1 is the top view of a conventional pixel structure. This pixel structure is called the "Cs on common" structure. This pixel structure is set on a substrate (not shown) and includes gate lines 10, a data line 11, and a thin film transistor 12. A pixel region is defined by arranging a plurality of gate lines 10 along a first direction and a plurality of data lines 11 along a second direction perpendicular to the first direction. The thin film transistor 12 includes a gate electrode 120, a channel layer 121, a source electrode 122 and a drain electrode 123. The gate electrode 120 is electrically connected to the gate line 10. The source electrode 122 is electrically connected to the data line 11. The drain 123 is electrically connected to the pixel electrode 13 through the contact window 14.

The pixel storage capacitor 16 includes a bottom electrode 15, a top electrode 17, and a dielectric layer between the bottom electrode 15 and the top electrode 17. The top electrode 17 is electrically connected to the pixel electrode 13 through the contact window 18. The bottom electrode 15 is a common line arranged in the pixel region approximately parallel to the gate line 10, and is in the first metal layer as same as the gate line 10 and the gate electrode 120. The top electrode 17, the data line 11, and the source/drain electrodes 122, 123 are formed by photographing and etching the second metal layer. A gate insulating layer (not shown) is disposed between the first metal and second metal layers. A passivation layer (not shown) is disposed between the second metal layer and the pixel electrode 13.

Figure 2:
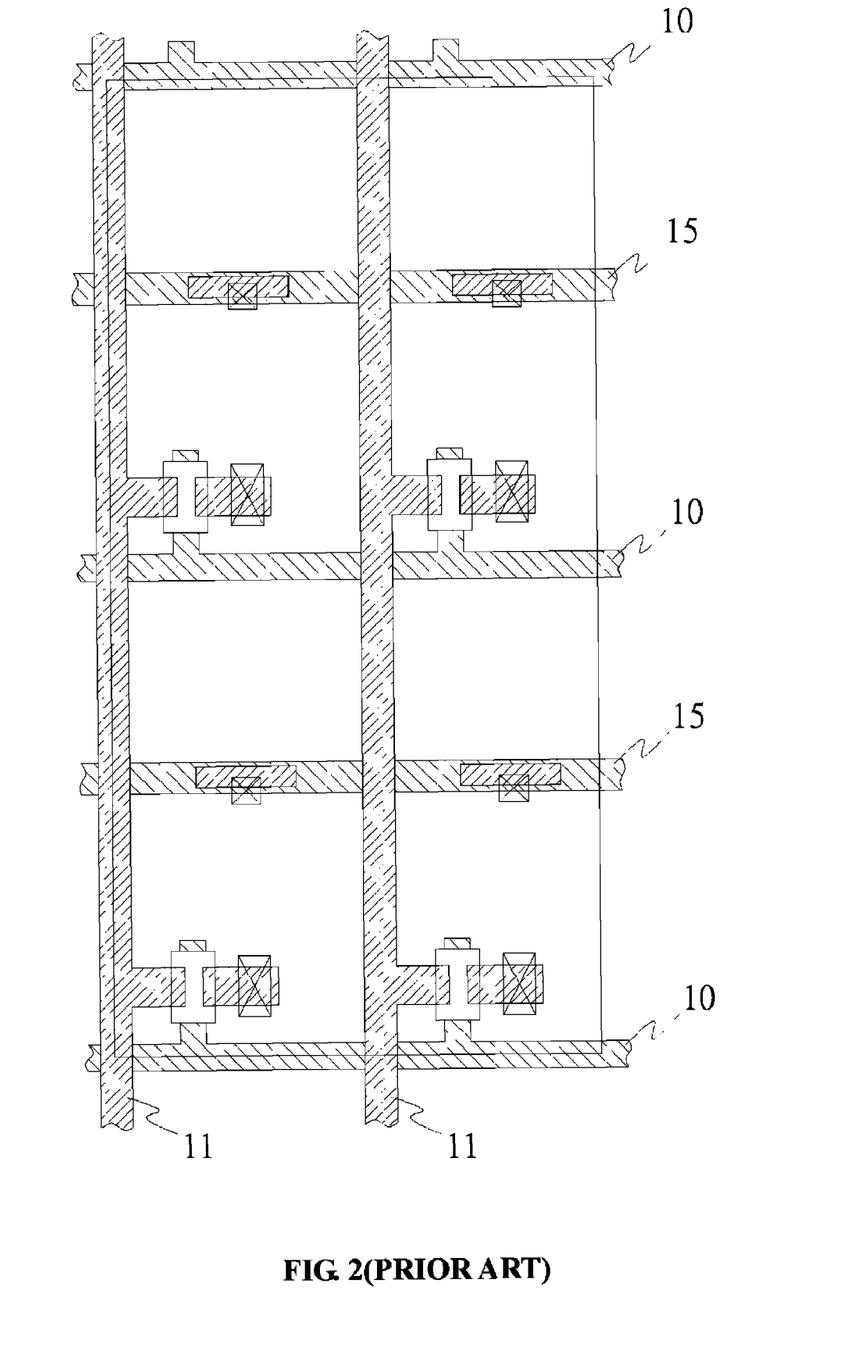
FIG. 2 is a top view of a conventional pixel array.

FIG. 2 is the top view of a conventional pixel array. In conventional pixel array, only the common lines 15 of the pixels arranged along the first direction are electrically connected. Therefore, the RC delay effect of the common line in conventional pixel array is still obvious and degrades a picture quality.

SUMMARY OF THE INVENTION

The primary objective of the present invention is to provide a liquid crystal display and a manufacture method thereof for reducing RC delay effect of the common line.

The present invention provides a liquid crystal display, comprising: a gate line disposed on a substrate; a data line intersecting the gate line; a first common line parallel with the gate line; a continuous second common line intersecting through the gate line.

In one preferred embodiment of the present invention, the first common line is in the first metal layer, the second common line is in the second metal layer, and the first and second common lines are electrically connected by a conductive element made of indium tin oxide.

In another preferred embodiment of the present invention, the first and the second common line are formed by photographing and etching the first metal layer. The gate line comprises a first segment and a second segment. The first and second segments are connected by a conductive element made of indium tin oxide. The second common line passes between the first segment and the second segment or passes between the first through hole and the second through hole.

To make it easier for our examiner to understand the objective of the invention, its structure, innovative features, and performance, we use the preferred embodiments together with the attached drawings for the detailed description of the invention.

DETAILED DESCRIPTION OF THE PREFERRED EMBODIMENTS

Figure 3:
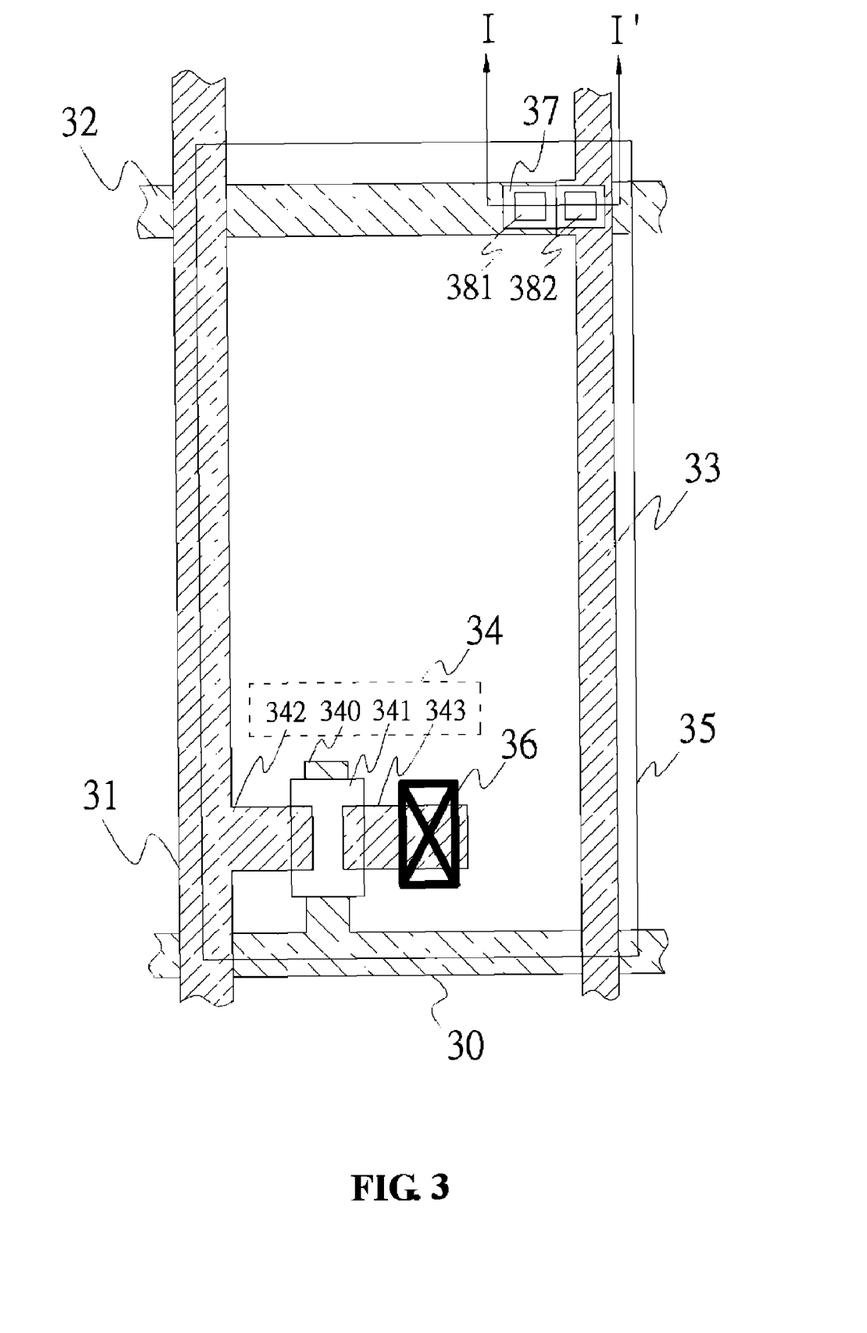
FIG. 3 is a top view of one preferred embodiment of a pixel structure of a liquid crystal display in accordance with the present invention.
Figure 4:
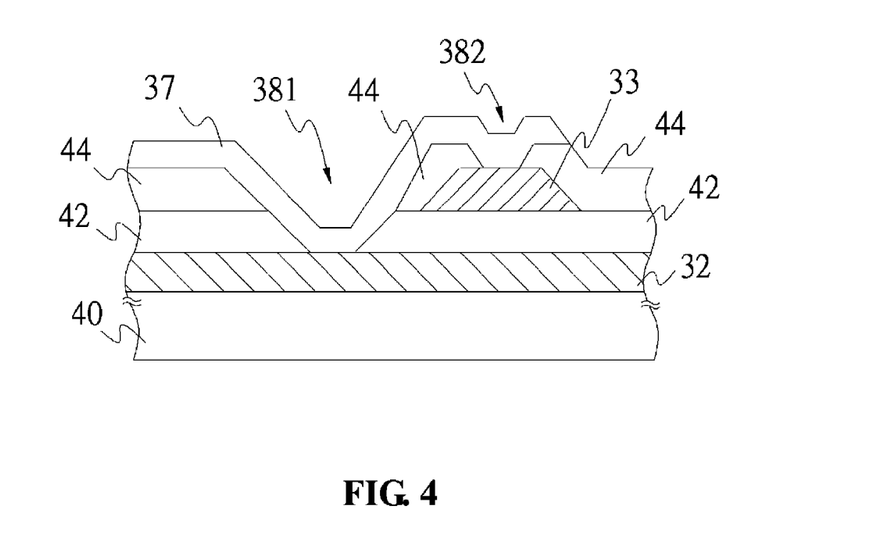
FIG. 4 is a sectional view through line I-I' as shown in FIG. 3.

FIG. 3 is a top view of one preferred embodiment of a pixel structure of a liquid crystal display in accordance with the present invention. FIG. 4 is a sectional view through line I-I' shown in FIG. 3.

In FIG. 3, the pixel structure comprises a gate line 30, a data line 31, a first common line 32, a continuous second common line 33 and a thin film transistor 34. The gate line 30 is arranged along a first direction and the data line 31 is arranged along a second direction perpendicular to the first direction. The first common line 32 is parallel with the gate line 30 and the second common line 33 intersects the gate line 30. The thin film transistor 34 includes a gate electrode 340, a channel layer 341, a source electrode 342 and a drain electrode 343. The gate electrode 340 is electrically connected to the gate line 30. The source electrode 342 is electrically connected to the data line 31. The drain electrode 343 is electrically connected to the pixel electrode 35 through the contact window 36.

The gate line 30, the first common line 32 and gate electrode 340 are formed by photographing and etching the first metal layer. The data line 31, the second common line 33, and the source electrode 342 and the drain electrode 343 are formed by photographing and etching the second metal layer. A gate insulating layer 42 is disposed between the first metal and second metal layers. The first common line 32 and the second common line 33 are electrically connected by a conductive element 37. The conductive element 37 is made of transparent conductive material, such as indium tin oxide, indium zinc oxide, aluminum-doped zinc oxide, or gallium-doped zinc oxide. A passivation layer 44 having a first through hole 381 and a second through hole 382 is set on the second common line 33, and the first through hole 381 corresponds to the first common line 32 and the second through hole 382 corresponds to the second common line 33. Therefore, the conductive element 37 electrically connects the first common line 32 and the second common line 33 via the first through hole 381 and the second through hole 382.

FIG. 4 shows the sectional view through line I-I' in FIG. 3. The method of fabricating a pixel structure of the present invention includes providing a substrate 40, wherein the substrate 40 is comprised of a glass substrate or a plastic substrate. Then a gate electrode 340, a gate line 30, and a first common line 32 are formed on the substrate 40, wherein the gate line 30 is electrically connected to the gate electrode 340 and the first common line 32 is approximately parallel to the gate line 30. The gate electrode 340, the gate line 30 and the first common line 32 belong to the first metal layer.

Then a gate insulating layer 42 is formed on the substrate 40 to cover the first metal layer including the gate electrode 340, the gate line 30 and the first common line 32. Next, a channel layer 341 is formed on the gate insulating layer 42. An ohmic contact layer (not shown) is formed on the surface of the channel layer to improve the electrical contact between the channel layer 341 and the subsequent formed source electrode 342 and drain electrode 343.

Then the data line 31 and the second common line 33 are formed on the gate insulating layer 42, and the source electrode 342 and drain electrode 343 are formed on the channel layer. The data line 31, the second common line 33, the source electrode 342 and drain electrode 343 belong to the second metal layer. The source electrode 342 is electrically connected to the data line 31. The gate electrode 340, the channel 341, the source electrode 342 and drain electrode 343 constitute a thin film transistor 34.

After forming second metal layer which includes the data line 31, the second common line 33, the source electrode 342 and drain electrode 343, a passivation layer 44 is formed on the substrate 40 to cover second metal layer. The material of the passivation layer 44 is comprised of silicon nitride or silicon oxide. Next, the passivation layer 44 and the gate insulating layer 42 are etched away to form the first through hole 381 corresponding to the first common line 32, and the passivation layer 44 is etched away to form the second through hole 382 corresponding to the second common line 33. Next, a transparent conductive material formed conductive element 37 is deposited on the passivation layer 44 so that the first common line 32 and the second common line 33 can electrically connected via the first through hole 381 and the second through hole 382. The transparent conductive material is preferably selected from a group consisting of indium tin oxide (ITO), indium zinc oxide (IZO), aluminum-doped zinc oxide (AZO), and gallium-doped zinc oxide (GZO).

Figure 5:
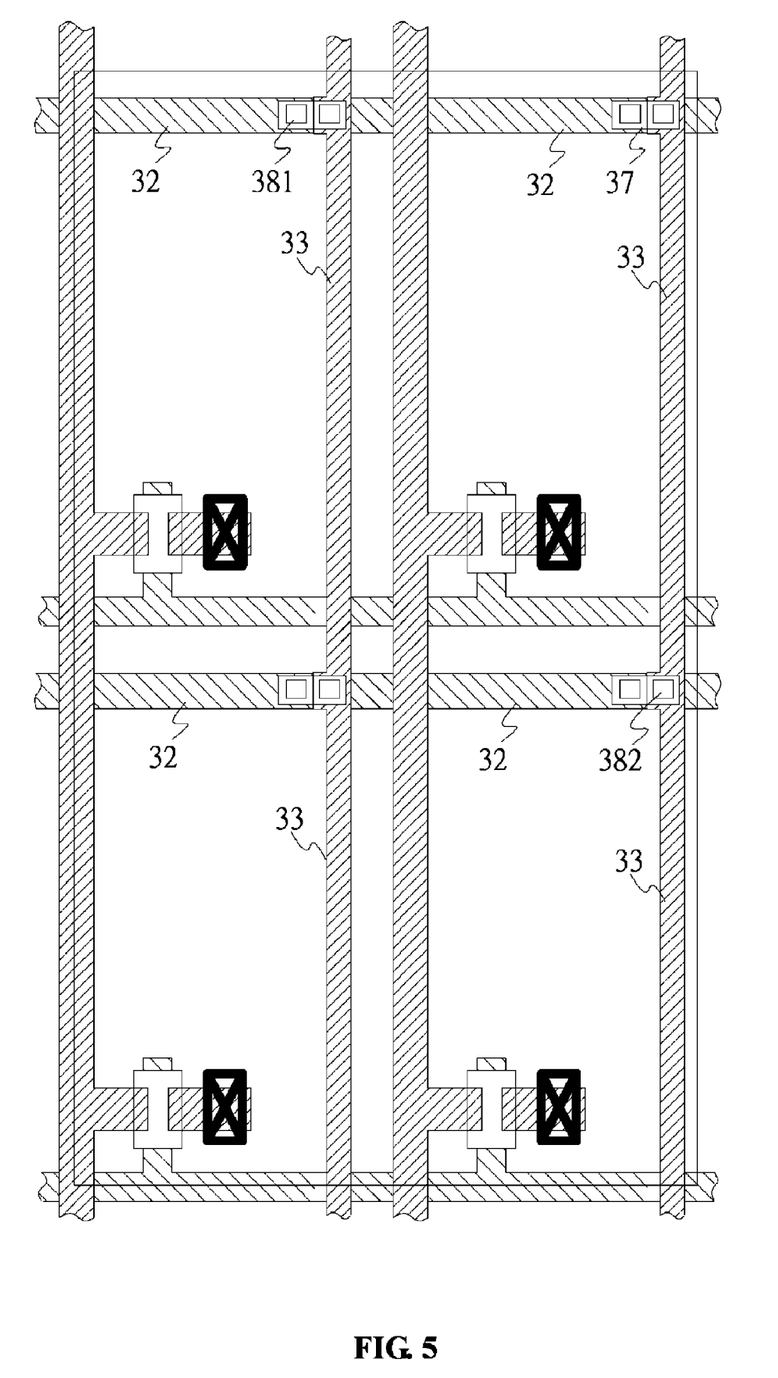
FIG. 5 is a top view of one preferred embodiment of a pixel array of a liquid crystal display in accordance with the present invention.

FIG. 5 is a top view of one preferred embodiment of a pixel array of a liquid crystal display in accordance with the present invention. In FIG. 5, first common lines 32 and second common lines 33 of pixels can be electrically connected via conductive elements 37, and form a reticular structure for reducing RC delay effect of the common line.

Figure 6:
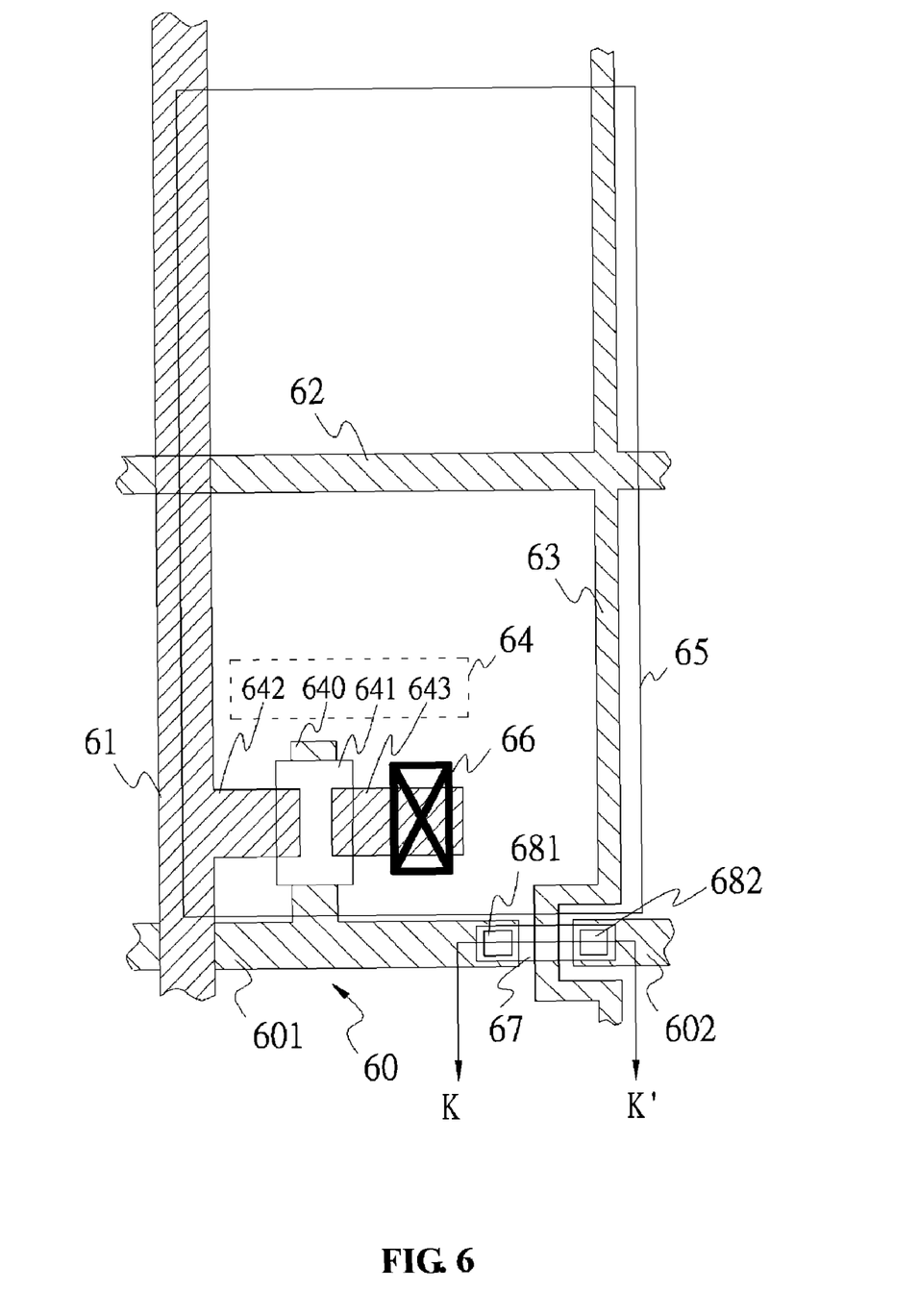
FIG. 6 is a top view of another preferred embodiment of a pixel structure of a liquid crystal display in accordance with the present invention.

FIG. 6 is a top view of another preferred embodiment of a pixel structure of a liquid crystal display in accordance with the present invention. In FIG. 6, the pixel structure comprises a gate line 60, a data line 61, a first common line 62, a continuous second common line 63 and a thin film transistor 64. The gate line 60 is arranged along a first direction and the data line 61 is arranged along a second direction perpendicular to the first direction. The first common line 62 is parallel with the gate line 60 and the second common line 63 intersects the gate line 60. The thin film transistor 64 includes a gate electrode 640, a channel layer 641, a source electrode 642 and a drain electrode 643. The gate electrode 640 is electrically connected to the gate line 60. The source electrode 642 is electrically connected to the data line 61. The drain electrode 643 is electrically connected to the pixel electrode 65 through the contact window 66.

In this embodiment of a pixel structure, the gate line 60 comprises a first segment 601 and a second segment 602. The second common line 63 passes between the first segment 601 and the second segment 602 or passes between the first through hole 681 and the second through hole 682. The first segment 601 and the second segment 602 are electrically connected by a conductive element 67 made of transparent conductive material, such as indium tin oxide, indium zinc oxide, aluminum-doped zinc oxide, and gallium-doped zinc oxide. The gate line 60, the first common line 62, the second common line 63 and gate electrode 640 are formed by photographing and etching the first metal layer. The data line 61, the source electrode 642 and the drain electrode 643 are formed by photographing and etching the second metal layer. A passivation layer 74 shown in FIG. 7 having a first through hole 681 and a second through hole 682 is set on the second common line 63, and the first through hole 681 corresponds to the first segment 601 and the second through hole 682 corresponds to the second segment 602. Therefore, the conductive element 67 electrically connects the first segment 601 and the second segment 602 via the first through hole 681 and the second through hole 682.

Figure 7:
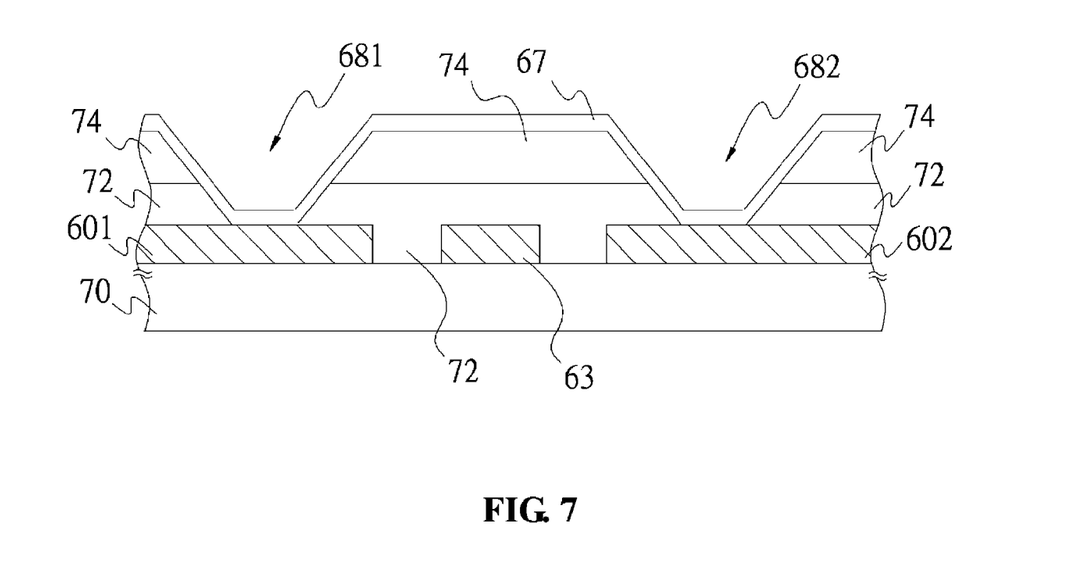
FIG. 7 is a sectional view through line K-K' as shown in FIG. 6.

FIG. 7 is a sectional view through line K-K' as shown in FIG. 6. The method Of fabricating a pixel structure of the present invention includes providing a substrate 70, wherein the substrate 70 is comprised of a glass substrate or a plastic substrate. Then a gate electrode 640, a gate line 60 including the first segment 601 and the second segment 602, a first common line 62 and a continuous second common line 63 are formed on the substrate 70, wherein the gate line 60 is electrically connected to the gate electrode 640 and the first common line 62 is approximately parallel to the gate line 60. The gate electrode 640, the gate line 60, the first common line 62 and the second common line 63 belong to first metal layer.

Then a gate insulating layer 72 is formed on the substrate 70 to cover first metal layer including the gate electrode 640, the first segment 601, the second segment 602, the first common line 62 and the second common line 63. Next, a channel layer 641 is formed on the gate insulating layer 72. An ohmic contact layer (not shown) is formed on the surface of the channel layer 641 to improve the electrical contact between the channel layer 641 and the subsequent formed source electrode 642 and drain electrode 643.

Then the data line 61 is formed on the gate insulating layer 72, and the source electrode 642 and the drain electrode 643 are formed on the channel layer. The data line 61, the source electrode 642 and the drain electrode 643 belong to second metal layer (not shown). The source electrode 642 is electrically connected to the data line 61. The gate electrode 640, the channel 641, and the source electrode 642 and the drain electrode 643 constitute a thin film transistor 64.

After forming second metal layer (including the data line 31, the source electrode 642 and the drain electrode 643), a passivation layer 74 is formed on the substrate 70 to cover second metal layer. The material of the passivation layer 74 is comprised of silicon nitride or silicon oxide. Next, the passivation layer 74 and the gate insulating layer 72 are etched away to form the first through hole 681 corresponding to the first segment 601 and the second through hole 682 corresponding to the second segment 602. Next, a transparent conductive material formed a conductive element 67 is deposited on the passivation layer 74 so that the first segment 601 and the second segment 602 can electrically connected via the first through hole 681 and the second through hole 682. The transparent conductive material is preferably selected from a group consisting of indium tin oxide (ITO) and indium zinc oxide (IZO), aluminum-doped zinc oxide (AZO), and gallium-doped zinc oxide (GZO).

Figure 8:
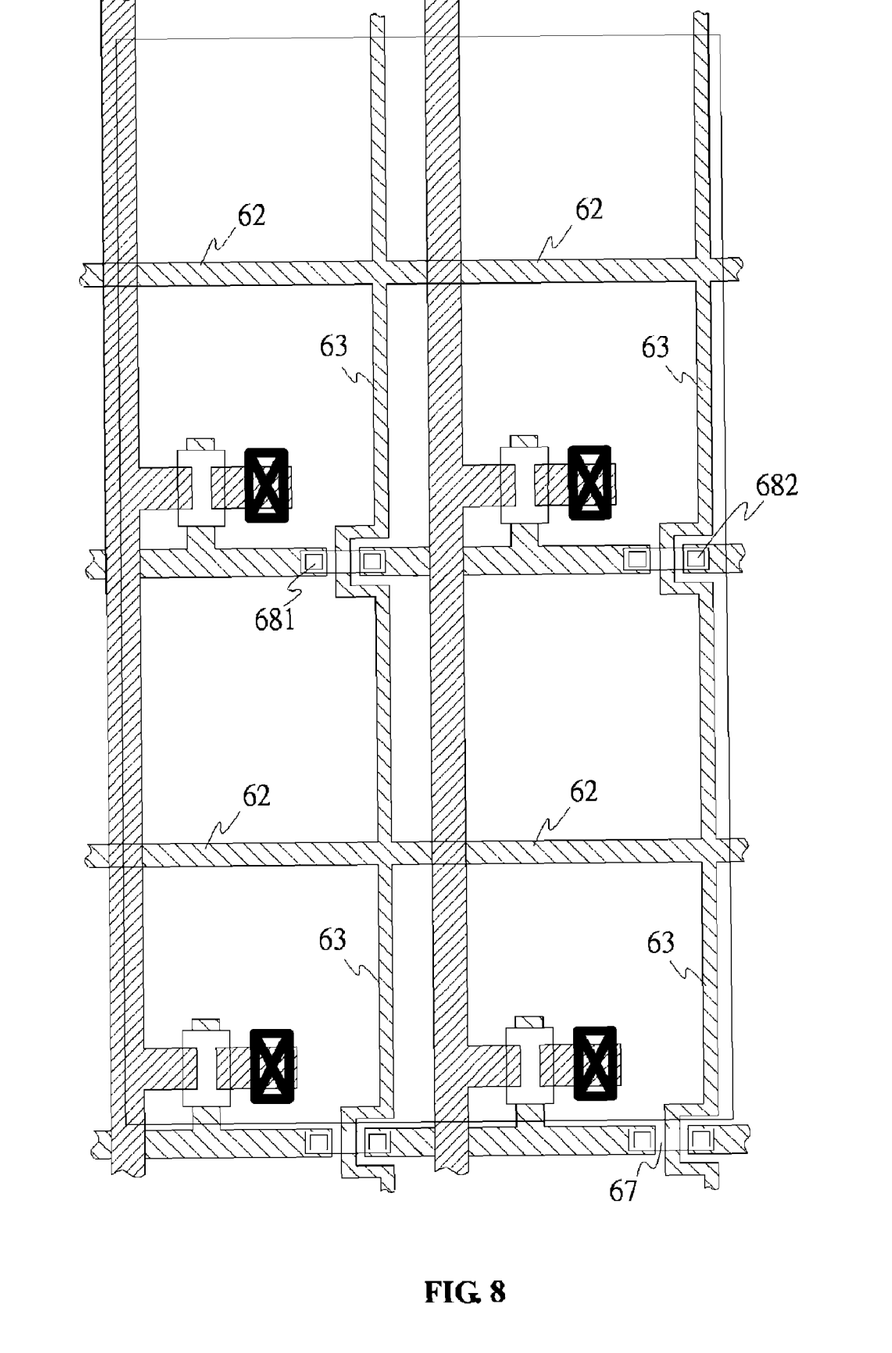
FIG. 8 is a top view of another preferred embodiment of a pixel array of a liquid crystal display in accordance with the present invention.

FIG. 8 is a top view of another preferred embodiment of a pixel array of a liquid crystal display in accordance with the present invention. In FIG. 8, first common lines 62 and second common lines 63 of pixels can be electrically connected and form a reticular structure for reducing RC delay effect of the common line.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display, comprising:
    a gate line disposed on a substrate;
    a data line intersecting the gate line;
    a first common line parallel with the gate line;
    a second common line intersecting through the gate line,
    wherein the gate line, the first common line and the second common line are in contact with a same surface of the substrate.

2. The liquid crystal display according to claim 1, further comprises:
    a gate insulating layer formed on the first common line and the second common line; and
    a passivation layer formed on the data line;
    wherein the passivation layer has a first through hole and a second through hole.

3. The liquid crystal display according to claim 2, wherein the gate line comprises a first segment and a second segment.

4. The liquid crystal display according to claim 3, wherein the second common line passes between the first segment and the second segment.

5. The liquid crystal display according to claim 3, wherein the second common line passes between the first through hole and the second through hole.

6. The liquid crystal display according to claim 3, wherein the first through hole corresponds to the first segment and the second through hole corresponds to the second segment.

7. The liquid crystal display according to claim 6, further comprises a conductive element connecting the first segment and the second segment via the first through hole and the second through hole.

8. The liquid crystal display according to claim 7, wherein the conductive element is made of a transparent conductive material.

9. The liquid crystal display according to claim 8, wherein the transparent conductive material is selected from a group consisting of indium tin oxide, indium zinc oxide, aluminum-doped zinc oxide, and gallium-doped zinc oxide.

10. A manufacture method of liquid crystal display, comprising steps of:
    forming a gate line disposed on a substrate;
    forming a data line intersecting the gate line;
    forming a first common line parallel with the gate line;
    forming a second common line intersecting through the gate line,
    wherein the gate line, the first common line and the second common line are in contact with a same surface of the substrate.

11. The manufacture method of liquid crystal display according to claim 10, further comprising steps of:
    forming a gate insulating layer on the first common line and the second common line;
    forming a passivation layer on the data line; and
    etching the passivation layer to form a first through hole and a second through hole.

12. The manufacture method of liquid crystal display according to claim 11, wherein the gate line comprises a first segment and a second segment.

13. The manufacture method of liquid crystal display according to claim 12, further comprising a step of:
    forming a conductive element connecting the first segment and the second segment via the first through hole and the second through hole.

14. The manufacture method of liquid crystal display according to claim 13, wherein the conductive element is made of a transparent conductive material selected from a group consisting of indium tin oxide, indium zinc oxide, aluminum-doped zinc oxide, and gallium-doped zinc oxide.

* * * * *